United States Patent
Singh et al.

(10) Patent No.: US 11,537,669 B1
(45) Date of Patent: Dec. 27, 2022

(54) PREPARATION OF SIGNATURE FIELDS WITHIN ELECTRONIC DOCUMENTS

(71) Applicant: Citrix Systems, Inc., Fort Lauderdale, FL (US)

(72) Inventors: Manbinder Pal Singh, Coral Springs, FL (US); Maanusri Balasubramanian, Tamil Nadu (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/343,110

(22) Filed: Jun. 9, 2021

(51) Int. Cl.
*G06F 16/93* (2019.01)
*G06F 40/174* (2020.01)
*G06Q 20/38* (2012.01)
*G06F 40/166* (2020.01)
*G06F 40/197* (2020.01)

(52) U.S. Cl.
CPC ............ *G06F 16/93* (2019.01); *G06F 40/174* (2020.01); *G06F 40/197* (2020.01); *G06Q 20/3825* (2013.01); *G06F 40/166* (2020.01)

(58) Field of Classification Search
CPC ...... G06F 16/93; G06F 40/174; G06F 40/197; G06F 40/166; G06Q 20/3825
See application file for complete search history.

(56) References Cited

U.S. PATENT DOCUMENTS

| | | | | |
|---|---|---|---|---|
| 7,568,104 B2 * | 7/2009 | Berryman | ................ | G06F 21/64 713/168 |
| 7,917,767 B2 * | 3/2011 | Berryman | ................ | G06F 21/64 713/168 |
| 8,650,038 B2 * | 2/2014 | Peirson, Jr. | ............ | G06Q 10/00 705/1.1 |
| 8,699,073 B2 * | 4/2014 | Natarajan | ................ | G06F 16/93 358/1.18 |
| 9,286,281 B2 | 3/2016 | Dunn et al. | | |
| 9,436,668 B2 | 9/2016 | Dunn et al. | | |
| 9,507,760 B2 | 11/2016 | Dunn et al. | | |
| 9,544,149 B2 * | 1/2017 | Follis | .................... | H04L 9/3247 |
| 9,594,739 B2 | 3/2017 | Dunn et al. | | |
| 9,760,960 B2 * | 9/2017 | Laine | ..................... | G06Q 10/00 |
| 10,032,133 B2 * | 7/2018 | Follis | .................. | G06F 21/6209 |
| 10,250,393 B2 * | 4/2019 | Follis | .................... | H04L 9/3247 |
| 10,546,053 B2 | 1/2020 | Dunn | | |
| 10,635,429 B2 | 4/2020 | Singh | | |

(Continued)

FOREIGN PATENT DOCUMENTS

| | | | | |
|---|---|---|---|---|
| EP | 2866157 | | 4/2015 | |
| WO | WO-2021174364 A1 * | 9/2021 | ........... | G06Q 20/363 |

OTHER PUBLICATIONS

International Search Report and Written Opinion for application No. PCT/US2022/031291, dated Aug. 19, 2022.

*Primary Examiner* — Benjamin Smith
(74) *Attorney, Agent, or Firm* — BainwoodHuang

(57) ABSTRACT

Techniques prepare a document for electronic signing. Such techniques involve identifying a set of signature fields common within the document, the set being for use with different pages of the document. Such techniques further involve, in response to identifying the set of signature fields, modifying content of the different pages to include the set of signature fields. Such techniques further involve outputting a prepared version of the document that includes the modified content of the different pages of the document.

20 Claims, 10 Drawing Sheets

(56) References Cited

U.S. PATENT DOCUMENTS

| | | | |
|---|---|---|---|
| 10,769,360 B1* | 9/2020 | Arnold | G06V 30/413 |
| 11,055,479 B2* | 7/2021 | Gazit | G06F 9/44526 |
| 11,132,105 B2* | 9/2021 | Hickey | G06F 3/0484 |
| 11,249,832 B2 | 2/2022 | Singh | |
| 11,249,833 B2 | 2/2022 | Singh et al. | |
| 2006/0161780 A1* | 7/2006 | Berryman | G06F 21/64 |
| | | | 713/176 |
| 2007/0188823 A1 | 8/2007 | Koide | |
| 2008/0260287 A1* | 10/2008 | Berryman | G06F 21/64 |
| | | | 382/284 |
| 2009/0025087 A1* | 1/2009 | Peirson, Jr. | G06Q 10/00 |
| | | | 713/193 |
| 2010/0100743 A1 | 4/2010 | Ali et al. | |
| 2010/0235727 A1* | 9/2010 | Ashton | H04L 9/3255 |
| | | | 715/253 |
| 2011/0093769 A1 | 4/2011 | Dunn et al. | |
| 2012/0257249 A1* | 10/2012 | Natarajan | G06F 16/93 |
| | | | 358/1.15 |
| 2012/0284602 A1 | 11/2012 | Seed et al. | |
| 2014/0229318 A1* | 8/2014 | Natarajan | G06F 40/143 |
| | | | 705/26.5 |
| 2015/0172058 A1* | 6/2015 | Follis | H04L 9/3247 |
| | | | 713/176 |
| 2015/0213404 A1* | 7/2015 | Follis | G06F 21/6209 |
| | | | 705/317 |
| 2015/0317643 A1 | 11/2015 | Mian et al. | |
| 2015/0358400 A1 | 12/2015 | Bartlett, II et al. | |
| 2016/0171634 A1* | 6/2016 | Laine | G06Q 10/00 |
| | | | 705/311 |
| 2016/0224526 A1* | 8/2016 | Gazit | G06F 9/3017 |
| 2016/0321214 A1* | 11/2016 | Hickey | G06F 40/169 |
| 2016/0335479 A1 | 11/2016 | Bartlett, II et al. | |
| 2017/0078103 A1* | 3/2017 | Follis | H04L 9/3247 |
| 2017/0345394 A1 | 11/2017 | Bansal et al. | |
| 2018/0039828 A1* | 2/2018 | Coad | H04L 9/3247 |
| 2018/0270070 A1* | 9/2018 | Altman | H04L 9/3247 |
| 2019/0362430 A1* | 11/2019 | Jass | G06Q 40/08 |
| 2020/0364323 A1 | 11/2020 | Bendersky | |
| 2021/0281421 A1* | 9/2021 | Semenovskiy | H04L 9/3231 |
| 2021/0286938 A1* | 9/2021 | Gazit | G06F 40/169 |

* cited by examiner

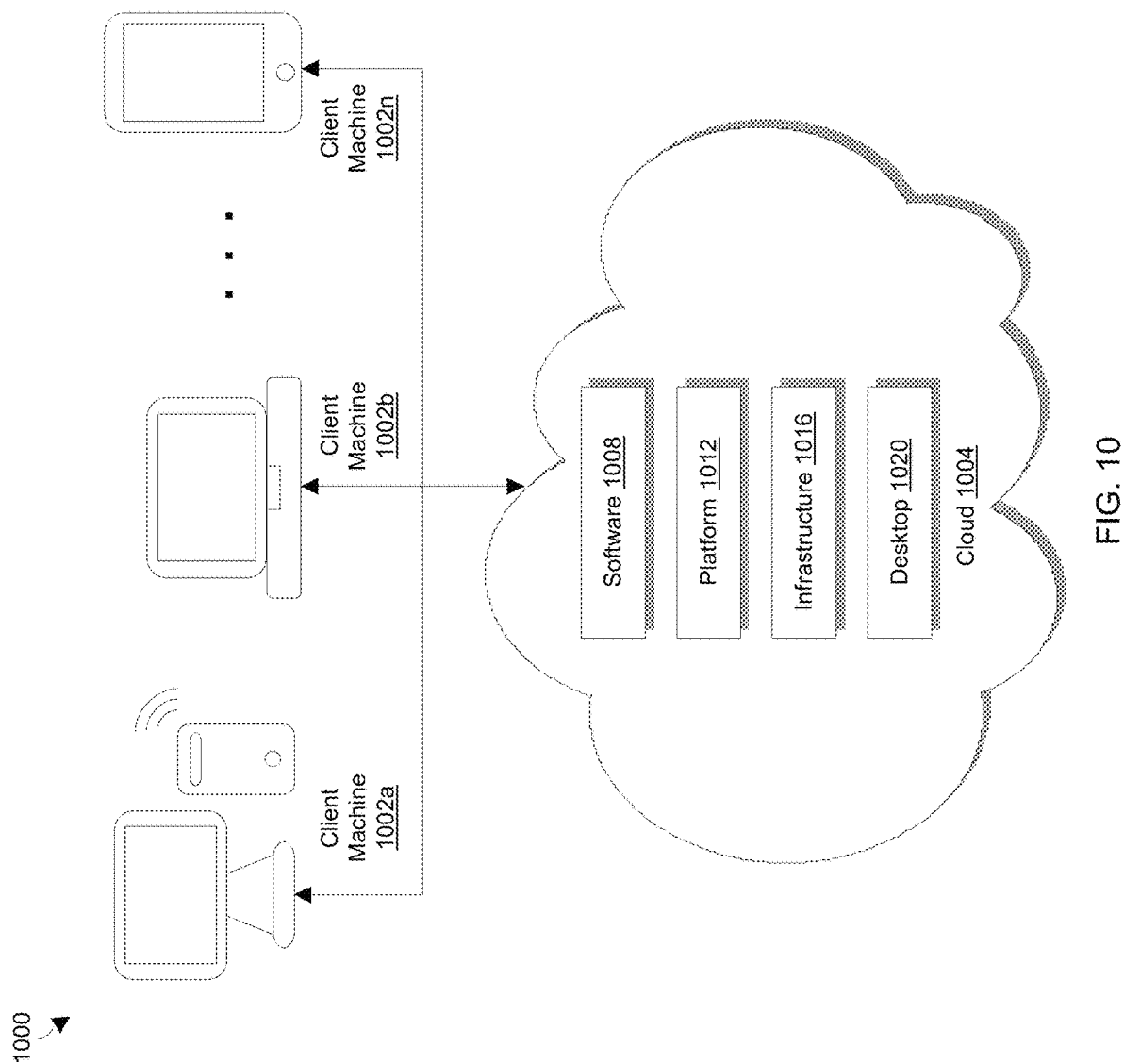

PREPARATION OF SIGNATURE FIELDS WITHIN ELECTRONIC DOCUMENTS

BACKGROUND

A conventional electronic signature application enables multiple parties to electronically sign contracts, leases, and purchase and sale agreements from their respective electronic devices. Such an application alleviates the need for the parties to appear at a physical location and sign in person. Later, the fully signed copy may be made electronically accessible to all parties.

SUMMARY

To prepare an agreement using the above-described conventional electronic signature application, a human preparer positions an electronic signature field over a signing area of the agreement. The human preparer then assigns (or links) the field to a particular party involved in the agreement to prevent the wrong party from electronically signing that field. The human preparer performs this positioning and assigning process for each signing party involved in the agreement.

After the human preparer has properly added all of the electronic signature fields to the agreement, the signing parties access the agreement from their respective electronic devices to individually enter electronic signatures into the appropriate electronic signature fields. The agreement is considered completed once all of the parties have electronically signed all of the fields.

Unfortunately, a human preparer is required to manually place various electronic signature fields over signing areas of the agreement, and assign the various electronic signature fields to the proper signing parties. For example, the human preparer may need to add fields for signing party initials at the bottom of each page, and then assign the added fields to the particular signing parties. For a single agreement that is 40-50 pages long in which the parties are required to sign each page, there is considerable effort required of the human preparer even though there is only one agreement. The required effort is magnified if the human preparer is a broker or agent (e.g., for weekly boat rentals, etc.) tasked with routinely preparing 100 s or even 1000 s of such agreements on a regular or highly frequent basis which may be extremely burdensome. Accordingly, such work can be tedious, time consuming, and prone to error.

In contrast to the above-described electronic signature application which requires a human preparer to manually position fields for signing party initials at the bottom of each page and then assign the positioned fields to the particular signing parties, improved techniques involve identifying sets of signature fields common to one another for use with different pages of a document. One or more other pages of the document may then be modified to include the set of signature fields. For example, such identification of the sets of signature fields common to one another may automatically provide a prompt (or query) to a user, and the user may respond with a command that directs subsequent placement and binding of the set of signature fields on the one or more other pages of the document for electronic signing. Accordingly, document preparation using the improved techniques is easy, efficient, and accurate.

One embodiment is directed to a method of preparing a document for electronic signing. The method includes identifying a set of signature fields common within the document (e.g., common to one another), the set being for use with different pages of a document. The method further includes, in response to identifying the set of signature fields, modifying content of the different pages to include the set of signature fields. The method further includes outputting a prepared version of the document that includes the modified content of the different pages of the document. Such activities may be performed electronically by a computing device.

Another embodiment is directed to electronic circuitry which includes memory and control circuitry coupled with the memory. The memory stores instructions that, when carried out by the control circuitry, cause the control circuitry to perform a method that includes:

(A) identifying a set of signature fields common within the document, the set being for use with different pages of a document;

(B) in response to identifying the set of signature fields, modifying content of the different pages to include the set of signature fields; and (C) outputting a prepared version of the document that includes the modified content of the different pages of the document.

Yet another embodiment is directed to a computer program product having a non-transitory computer readable medium which stores a set of instructions to prepare a document for electronic signing. The set of instructions, when carried out by computerized circuitry, causes the computerized circuitry to perform a method of:

(A) identifying a set of signature fields common within the document, the set being for use with different pages of a document;

(B) in response to identifying the set of signature fields, modifying content of the different pages to include the set of signature fields; and (C) outputting a prepared version of the document that includes the modified content of the different pages of the document.

In some arrangements, identifying the set of signature fields common within the document includes detecting placement of a common set of fields on at least two pages of the document. Accordingly, a repetitive manual task may be detected thus allowing for an automatic prompt to repeat that task for other pages.

In some arrangements, detecting placement of the common set of fields includes detecting placement of a first set of fields on a first page of the document, detecting placement of a second set of fields on a second page of the document, the first page and the second page being consecutive pages of the document, and ascertaining that the first set of fields matches the second set of fields.

In some arrangements, identifying the set of signature fields common within the document further includes ascertaining that the common set of fields has been placed on a first open area on a first page of the document and on a second open area on a second page of the document. The first open area on the first page and the second open area on the second page have page locations common to one another.

In some arrangements, identifying the set of signature fields common within the document further includes, in response to detecting placement of the common set of fields on the at least two pages of the document, automatically prompting a user for an instruction to place the set of signature fields on pages of the document other than the at least two pages of the document, and receiving, from the user, the instruction to place the set of signature fields on the pages of the document other than the at least two pages of the document.

In some arrangements, the set of signature fields includes fields configured to receive signature input from different signing parties.

In other arrangements, the set of signature fields includes a single field configured to receive signature input from a particular signing party.

In some arrangements, modifying the content of the different pages includes identifying respective placement locations on the different pages of the document.

In some arrangements, identifying the respective placement locations on the different pages of the document includes, for each page of a group of pages of the document, scanning that page for a peripheral open area on that page and selecting the peripheral open area on that page as a respective placement location on that page to receive the set of signature fields.

In some arrangements, the techniques further involve detecting a page of the document that does not have a peripheral open area, and flagging the detected page to a user to enable the user to manually identify a placement location on the detected page for receiving the set of signature fields.

In some arrangements, identifying the respective placement locations on the different pages of the document includes, for each page of a group of pages of the document, scanning that page for an unused bottom area on that page and selecting the unused bottom area on that page on that page as a respective placement location on that page to receive the set of signature fields.

In some arrangements, identifying the respective placement locations on the different pages of the document includes ascertaining location coordinates for the common set of signature fields placed on the at least two pages of the document, and providing, as the respective placement locations on the different pages of the document, the location coordinates ascertained for the common set of signature fields.

In some arrangements, the techniques further involve situating, on at least one of the pages of the document, a set of full signature fields that is different from the set of signature fields common within the document.

In some arrangements, the set of full signature fields is configured to receive a set of full signatures from a set of signing parties. Additionally, the set of signature fields common within the document is configured to receive a set of initials from the set of signing parties.

In some arrangements, the set of full signature fields is configured to receive a set of full signatures from a set of signing parties. Additionally, the set of signature fields common within the document is configured to receive a signed attestation from at least one of the signing parties.

Other embodiments are directed to electronic systems and apparatus, processing circuits, computer program products, and so on. Some embodiments are directed to various methods, electronic components and equipment that are involved in utilizing auto configuration and placement of electronic signature fields within a document.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 10 is a schematic block diagram of a cloud computing environment in which various aspects of the disclosure may be implemented.

DETAILED DESCRIPTION

An improved technique involves identifying sets of signature fields common to one another for use with different pages of a document. One or more other pages of the document may then be modified to include the set of signature fields. For example, such identification of the sets of signature fields common to one another may automatically provide a prompt (or query) to a user, and the user may respond to the prompt with a command that directs placement and binding of the set of signature fields on the one or more other pages of the document for electronic signing. Accordingly, document preparation using the improved techniques is easy, efficient, and accurate.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
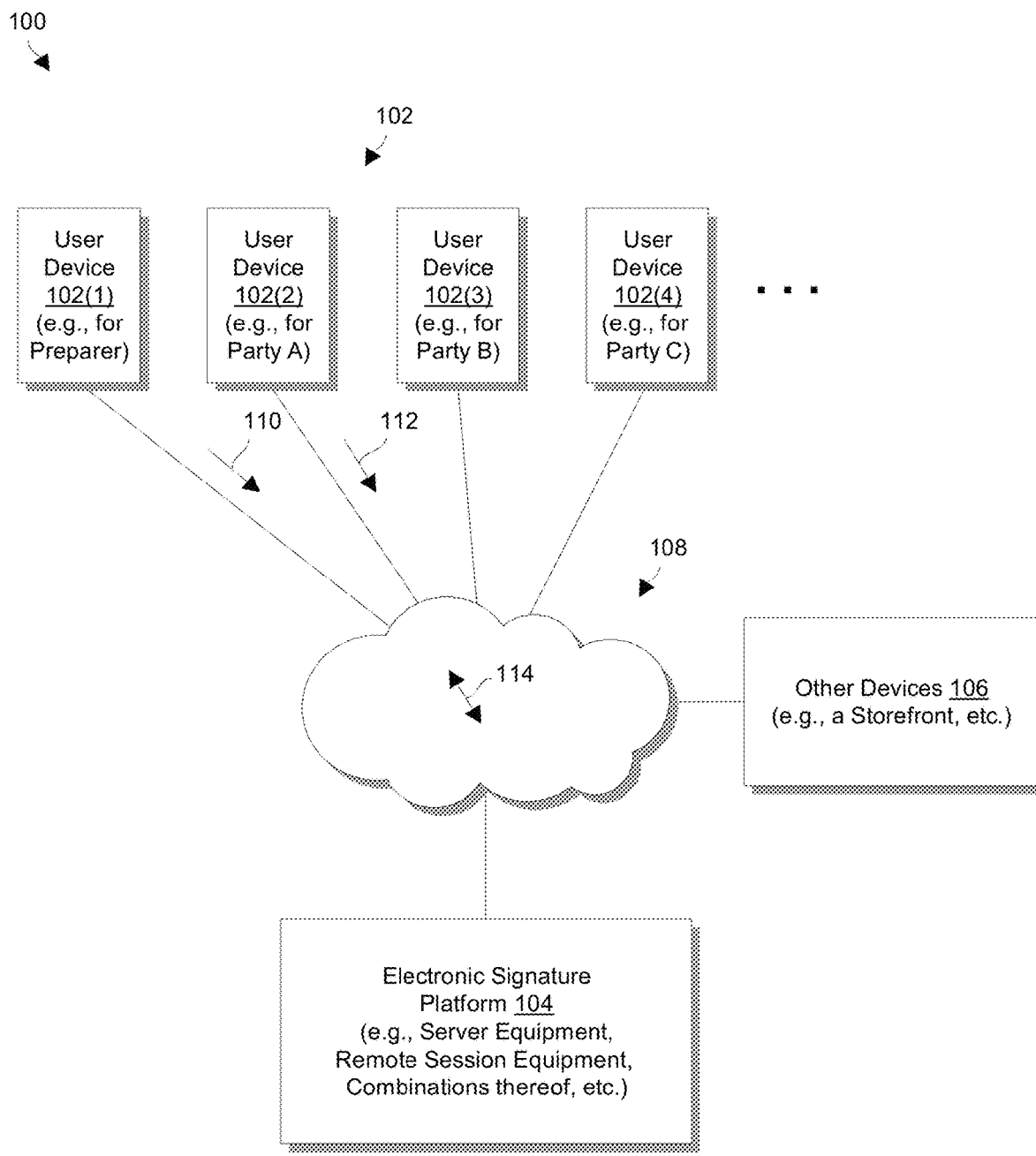
FIG. 1 is a block diagram of a computing environment to configure and place electronic signature fields within a document in accordance with certain embodiments.

FIG. 1 shows a computing environment 100 to configure and place electronic signature fields within a document in accordance with certain embodiments. The computing environment 100 includes user devices 102(1), 102(2), 102(3), 102(4), . . . (collectively, user devices 102), an electronic signature platform 104, other devices 106, and a communications medium 108. For illustration purposes and as will be explained in further detail below, the computing environment 100 may provide a virtual desktop infrastructure (VDI) where one or more of the user devices 102 operates as a virtual desktop client that enables a user to control a remote desktop session hosted by the electronic signature platform 104 which operates as remote session equipment. Additionally, the computing environment 100 may be implemented as a cloud computing environment in which there is delivery of shared computing services and/or resources (e.g., infrastructures to support web and other related cloud services) to multiple users or tenants.

The user devices 102 are equipped with user interfaces (e.g., electronic displays, touchscreens, keyboards, pointing apparatus, combinations thereof, etc.) that enable human users operating the user devices 102 to perform useful work. Examples of suitable user devices 102 include smartphones, tablets, laptops, desktop computers, workstations, application specific or dedicated computerized equipment, combinations thereof, and so on.

By way of example, the user devices 102 are operated by a variety of different users that participate in preparation of a document for electronic signature and electronic signing. Along these lines, the user device 102(1) may be operated by a preparer, the user device 102(2) may be operated by Party A (e.g., a seller), the user device 102(3) may be operated by Party B (e.g., another seller), the user device 102(4) may be operated by Party C (e.g., a buyer), and so on. Each user (or party) has a distinct role (i.e., a part or function) as a signer. The particular roles (e.g., seller, buyer, lessor, lessee, borrower, lender, offeror, etc.) may vary based on the particular type of document (e.g., a purchase agreement, a rental agreement, a loan agreement, an offer letter, etc.).

The electronic signature platform 104 is constructed and arranged to facilitate preparation of a document for electronic signature in response to document preparation input 110 from one or more user devices 102. Similarly, the electronic signature platform 104 is constructed and arranged to facilitate completion of the document in response to electronic signing input 112 from one or more user devices 102.

For document preparation, since the user device 102(1) is described above as being operated by a preparer, the user device 102(1) is shown in FIG. 1 as providing the document preparation input 110 to the electronic signature platform 104. In response to the document preparation input 110, the electronic signature platform 104 identifies a set of signature fields common (or repeated) within the document, the set being for use with different pages of a document. After the electronic signature platform 104 has identified the set of signature fields, the electronic signature platform 104 automatically provides a prompt for adding the set of signature fields on one or more other pages within the document. If the user enters an acceptance command in response to the prompt, the electronic signature platform 104 modifies content of the different pages to include the set of signature fields, and outputs a prepared version of the document that includes the modified content of the different pages of the document. The electronic signature platform 104 then provides the prepared version of the document for different persons (e.g., Party A, Party B, Party C, etc.) to electronically sign.

For document completion, the various parties enter the signing input 112 (e.g., electronic signatures) via their respective user devices 102 to electronically sign the document. For example, Party A may enter respective signing input 112 via the user device 102(2), Party B may enter respective signing input 112 via the user device 102(3), Party C may enter respective signing input 112 via the user device 102(4), and so on. The document is considered to be fully completed once all of the parties have completed all of the fields.

It should be understood that the equipment for the electronic signature platform 104 may be centrally located. Alternatively, such equipment may be distributed among different locations. Examples include mainframes, clusters, cloud-based systems, datacenters, combinations thereof, and so on.

The other devices 106 represent other electronic apparatus that may be involved in preparing and/or completing a document. For example, a device 106 may operate as a storefront through which the preparer may enroll for an electronic signature service that enables the preparer to prepare documents for electronic signing. As another example, another device 106 may be operated by an entity or organization that uses the document after the document is completed (e.g., a document recordation server or registry, a website for a merchant, an appointment or scheduling system, etc.), and so on.

The communications medium 108 is constructed and arranged to connect the various components of the computing environment 100 together to enable these components to exchange electronic signals 114 (e.g., see the double arrow 114). At least a portion of the communications medium 108 is illustrated as a cloud to indicate that the communications medium 108 is capable of having a variety of different topologies including backbone, hub and spoke, loop, irregular, combinations thereof, and so on. Along these lines, the communications medium 108 may include copper based data communications devices and cabling, fiber optic devices and cabling, wireless devices, combinations thereof, etc. Furthermore, the communications medium 108 is capable of supporting a variety of communications types such as Ethernet-based communications, cellular communications, plain old telephone service (POTS) communications, combinations thereof, and so on.

In some situations, at least a portion of the computing environment 100 utilizes a virtualization platform that runs virtual machines (VMs) for scalability, load balancing, fault tolerance, and so on. Additionally, in some situations, the computing environment 100 delivers cloud-based computing services and/or resources to multiple users or tenants (e.g., infrastructures for cloud and web services). In some arrangements, one or more components of the computing environment 100 (e.g., the electronic signature platform, a storefront, etc.) are co-located in a datacenter (e.g., hosted on one or more data center servers) which utilizes the virtualization platform. Further details will now be provided with reference to FIG. 2.

Figure 2:
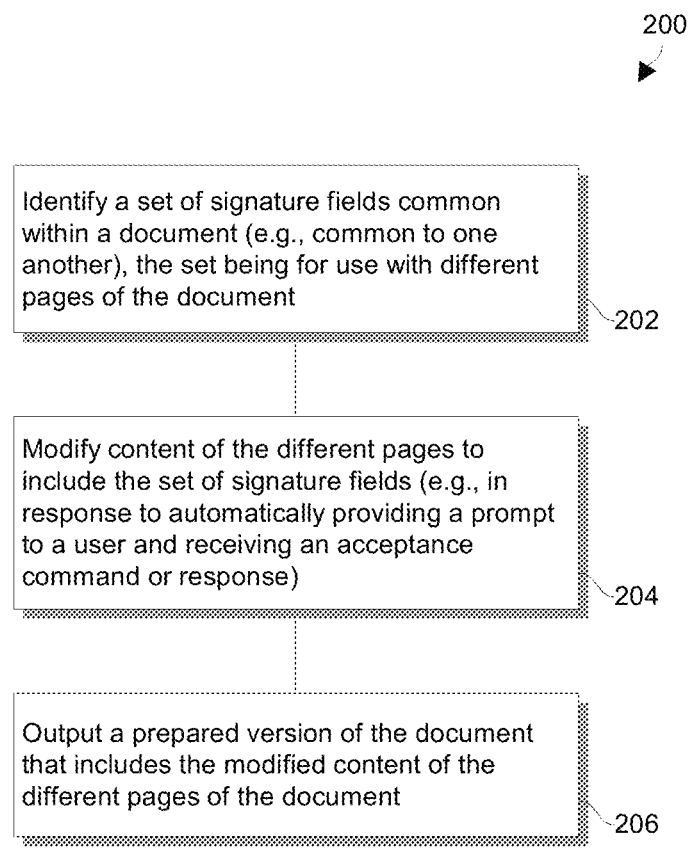
FIG. 2 is a flowchart of a procedure that is performed by electronic circuitry of the computing environment in accordance with certain embodiments.

FIG. 2 is a flowchart of a procedure 200 for configuration and placement of electronic signature fields within a document in accordance with certain embodiments. The procedure 200 may be performed by electronic circuitry of the computing environment 100 (FIG. 1). Such electronic circuitry may reside at the electronic signature platform and/or at one or more other devices such as the user device 102 of the preparer.

At 202, the electronic circuitry identifies a set of signature fields common within the document, the set being for use with different pages of a document. In particular, the electronic circuitry senses that the preparer has added a set of signature fields to a page of the document, and the same set of signature fields to another page of the document. Along these lines, the electronic circuitry may compare currently entered field configuration and placement input with previously entered field configuration and placement input. For example, the document may be a contract having several pages and the electronic circuitry detects that the preparer has added a first initial field for a first party to initial and a second initial field for a second party to initial at bottoms of first and second pages of the document. As another example, the document may be an estate planning document and the electronic circuitry detects that the preparer has added an attestation field for electronic signing by a particular party in a particular area of first and second pages of the document.

In response to such identification, at 204, the electronic circuitry automatically allows for modifying content of the different pages to include the set of signature fields. In some arrangements, when the electronic circuitry detects that the preparer has added a set of signature fields to one page of the document and the same set of signature fields to another page of the document, the electronic circuitry automatically provides a prompt to the preparer asking the preparer for a command indicating whether the preparer directs the electronic circuitry to add the set of signature fields to other pages of the document. If the preparer responds to the prompt with an acceptance command, the electronic circuitry adds the set of signature fields to the other pages simply in response to the acceptance command thus alleviating the need for the preparer to manually add the set of signature fields.

At 206, the electronic circuitry outputs a prepared version of the document that includes the modified content of the different pages of the document. In some arrangements, the electronic circuitry works with the preparer to include other signature fields on various pages of the document (e.g., fields requiring long or complete signatures, gender boxes, title fields, suffix fields, other selection/answer boxes and GUI widgets, and so on for completion by one or more parties).

The preparer also has the ability to review the document and perhaps make adjustments as seen fit at any time. Once the preparer considers the document ready for completion, the preparer notifies the signing parties that the document is ready for electronic signature. For example, the preparer may provide a command to the electronic circuitry that directs the electronic circuitry to send respective email messages to the signing parties with instructions and network links to the document.

In accordance with certain embodiments, the signing parties are restricted to providing signature input to only certain input fields in response to input from the prepare that binds parties to particular signature fields. For example, a first seller may be provided with privileges to complete a first set of input fields just for the first seller, a second seller may be provided with privileges to complete a second set of input fields just for the second seller, a first buyer may be provided with privileges to complete a third set of input fields just for the first buyer, and so on. Such restrictions may be imposed in a variety of ways such as via different network links to the document where the different links (or metadata within the links) provide different signing privileges, requiring initial enrollment by the parties and then offering document completion abilities via logging into respective accounts, requiring the parties to enter unique codes/passwords/etc., and so on. Further details will now be provided with reference to FIGS. 3 through 6.

Figure 3:
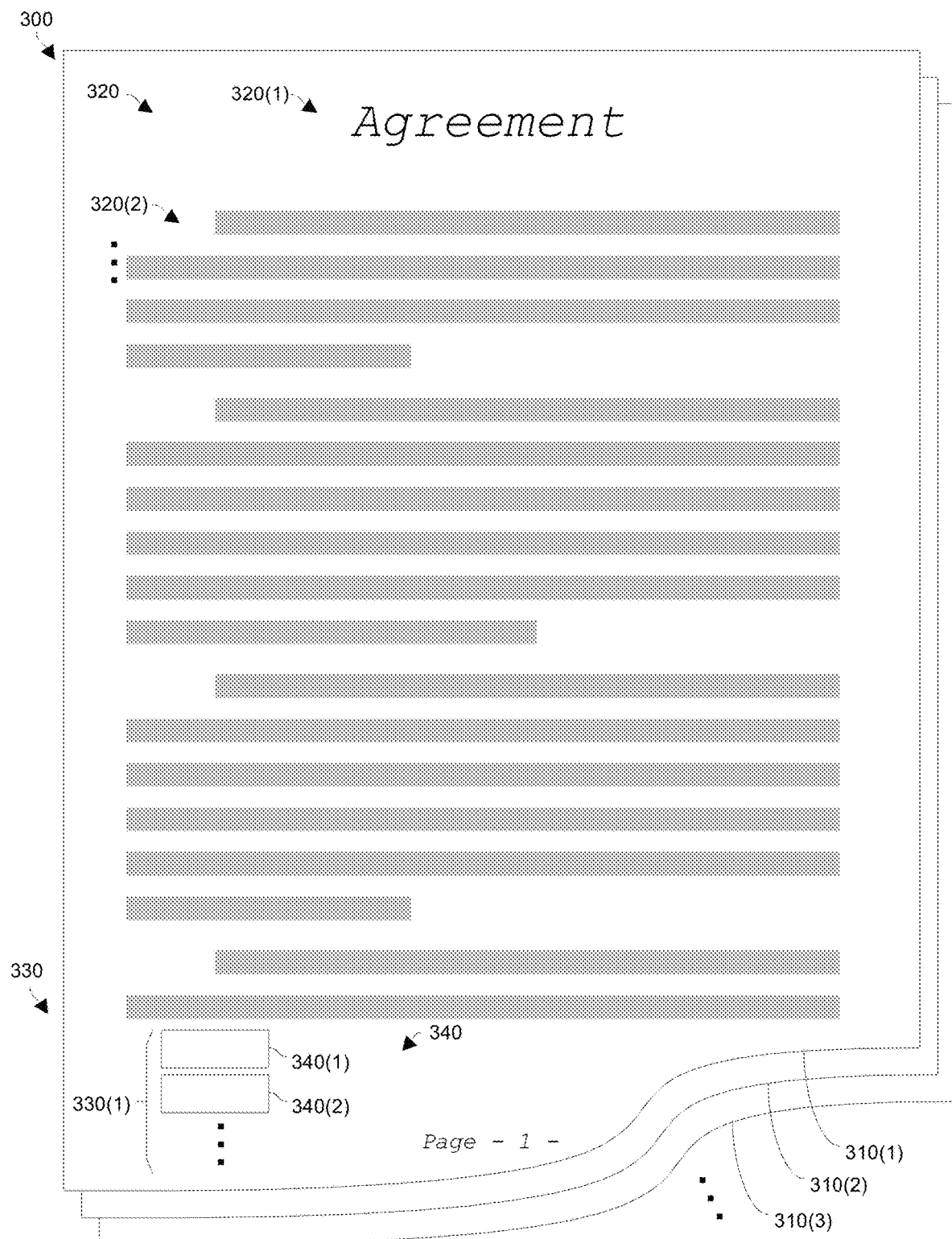
FIG. 3 is a view of certain details of one page of an example document in accordance with certain embodiments.
Figure 4:
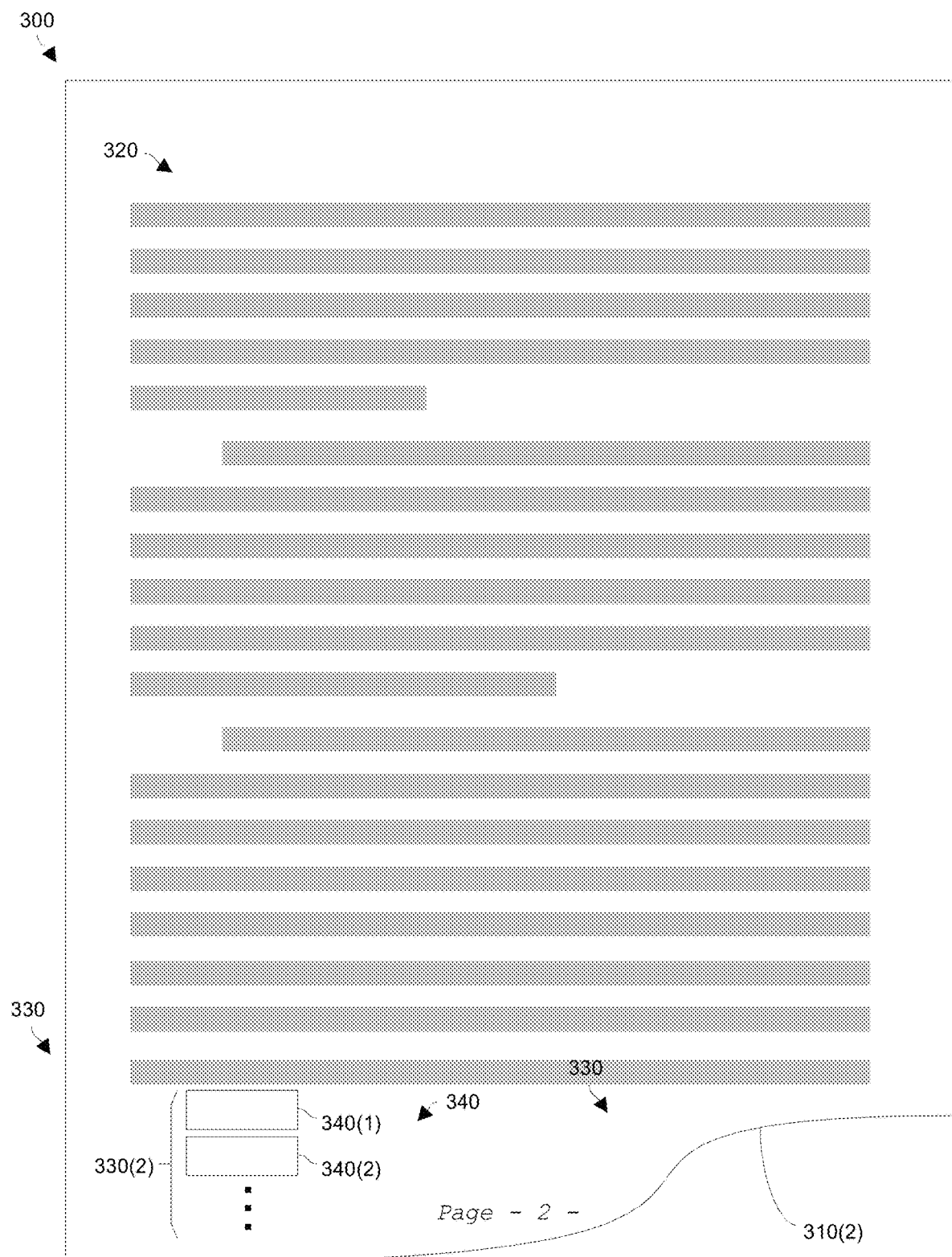
FIG. 4 is a view of certain details of another page of the example document in accordance with certain embodiments.
Figure 5:
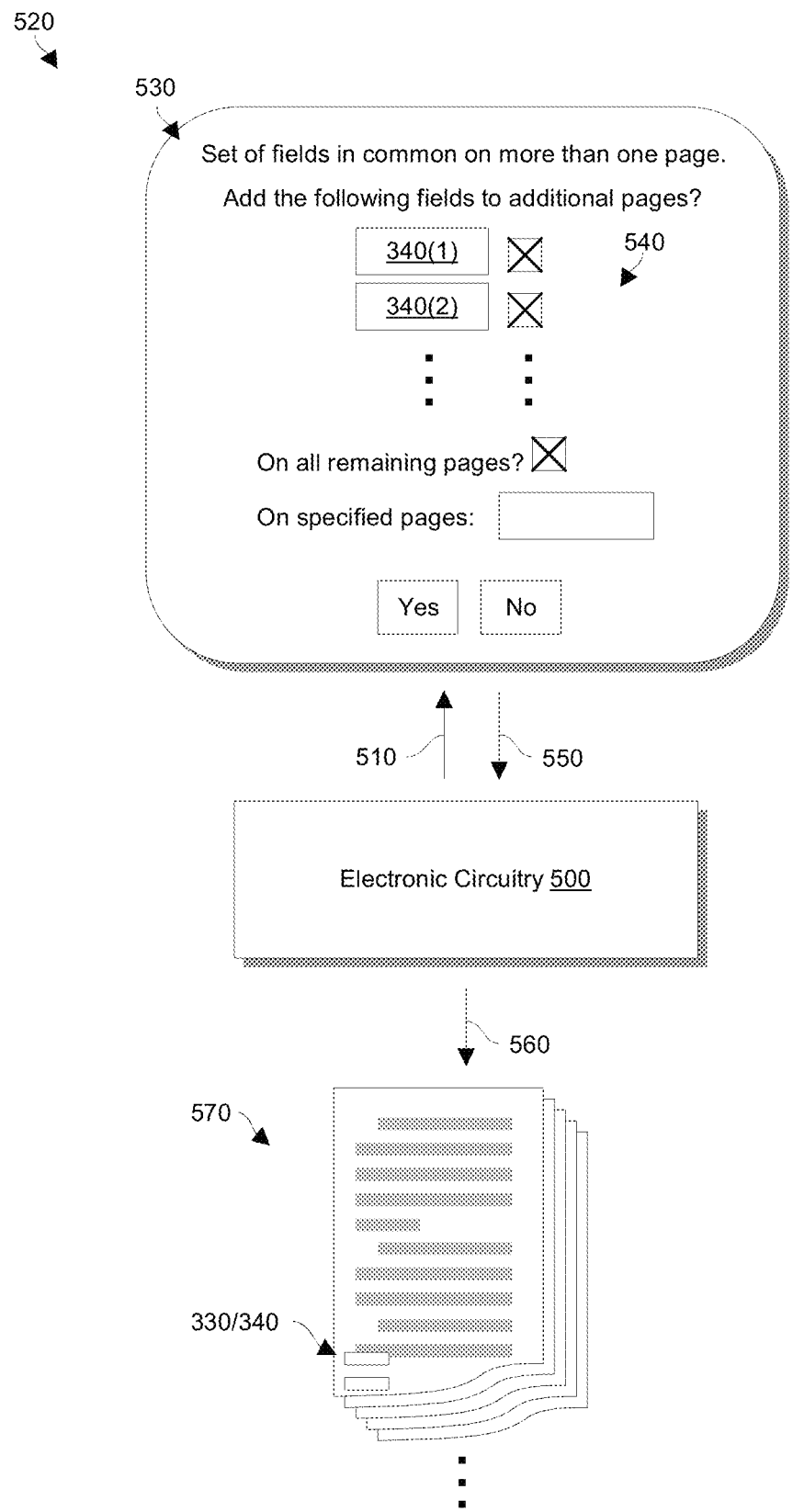
FIG. 5 is a view of certain document preparation details in accordance with certain embodiments.
Figure 6:
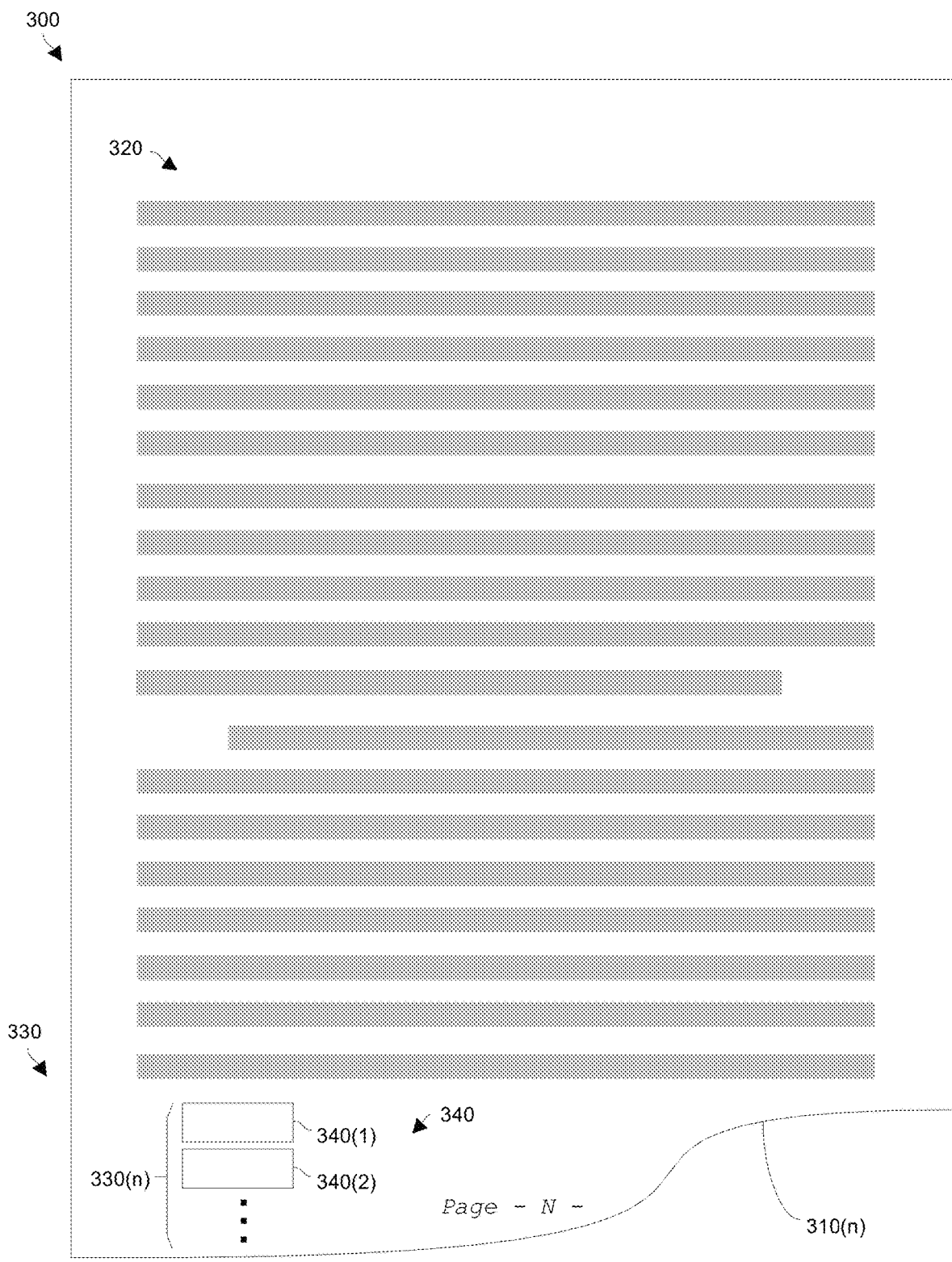
FIG. 6 is a view of certain details of yet another page of the example document in accordance with certain embodiments.

FIGS. 3 through 6 show certain details involved to configure and place electronic signature fields within a document in accordance with certain embodiments. FIG. 3 shows an example page of an example document in accordance with certain embodiments. FIG. 4 shows another example page of the example document in accordance with certain embodiments. FIG. 5 shows certain document preparation details in accordance with certain embodiments. FIG. 6 shows certain details of yet another page of the example document in accordance with certain embodiments.

As best seen in FIGS. 3 and 4, suitable document preparation input 110 from the preparer includes an example document 300 having pages 310(1), 310(2), 310(3), . . . (collectively, pages 310). Such pages 310 include content 320(1), 320(2), . . . (collectively, content 320) such as a title or header, language identifying parties, paragraphs/clauses containing terms/details/conditions/etc., figures, tables, charts, schedules, maps, addendums, amendments, combinations thereof, and so on.

The document preparation input 110 from the preparer further includes instructions directing the electronic circuitry to add electronic signature fields 330 to various pages 310 of the document 300. In particular, the preparer may include different types of signature fields 330 such as fields configured to receive initials as electronic signature input, fields configured to receive long (or complete) signatures as electronic signature input, attestation fields, and so on. Along these lines, the preparer may select a particular type of signature field 330 (e.g., from a table or menu), position that signature field 330 on a page 310 of the document 300, and bind or associate a particular signing party to that signature field 330.

By way of example and as shown in FIG. 3, the preparer directs the electronic circuitry to add a set of signature fields 330(1) on the page 310(1). In this example, the set of signature fields 330(1) includes a signature field 340(1) to receive electronic signature initials from a first party, a signature field 340(2) to receive electronic signature initials from a second party, and so on.

As shown in FIG. 4, the preparer then directs the electronic circuitry to add a set of signature fields 330(2) on the page 310(2) (e.g., by providing or initiating a command to the system). Similarly, the set of signature fields 330(2) includes another signature field 340(1) to receive electronic signature initials from the first party, another signature field 340(2) to receive electronic signature initials from the second party, and so on. Accordingly, the set of signature fields 330(1), 330(2) have the same signature fields 340(1), 340(2), . . . in common.

As the preparer enters the document preparation input 110, the electronic circuitry monitors the preparer's activities and determines that the preparer has added the same set of signature fields 330 to the pages 310(1), 310(2). That is, the electronic circuitry identifies that the sets of signature fields 330 are common to one another within the document 300, the set 330 being for use with different pages 310 of the document 300.

In response to such detection, the electronic circuitry automatically queries or asks the preparer about whether or not to modify other pages 310 of the document. The query may include a command or other request for input to modify content of other pages 310 of the document 300 to include the same set of signature fields 330. If the preparer enters input or initiates the command, the electronic circuitry includes the set of signature fields 330 in one or more other pages 310 of the document 300 based on the configuration and placement of similar fields already provided in the document.

FIG. 5 shows electronic circuitry 500 which is equipped to provide auto configuration and placement of electronic signature fields within a document. As mentioned earlier, such electronic circuitry 500 may reside at the electronic signature platform 104 and/or at one or more other devices 102 such as the user device 102(1) of the preparer.

As shown in FIG. 5, the electronic circuitry 500 provides a prompt (or query) 510 to the preparer. Such an example prompt 510 may be presented in a window (or other dialog box or similar type of interface) 520 to the preparer via a browser, a specialized graphical user interface (GUI), etc.

By way of example only, the prompt 510 includes various items of information 530 and a set of queries 540. Such items of information 530 may include a notification that the electronic circuitry 500 has detected a set 330 of signature fields 340 in common, or repeated, on more than one page 310 of the document 300 (also see FIGS. 3 and 4), a listing of the fields 340 in the set 330, an indication that the electronic circuitry 500 is able to add the set 330 of fields 340 to other pages 310, and so on.

In some arrangements, the electronic circuitry 500 may be instructed to add the set 330 of fields 340 to all of the remaining pages 310 of the document 300. In some arrangements, the electronic circuitry 500 may be instructed to add the set 330 of fields 340 to specified remaining pages 310 (e.g., in a manner similar to identifying document pages for printing on a printer). Other methodologies for adding the set 330 of fields 340 are suitable for use such enabling the preparer to identify certain pages 310 to omit from adding fields 340 such as the last page or a specified full signing page, omitting the set 330 of fields 340 from any pages that are configured to receive full signatures or that already include the set 330 of fields 340, omitting certain fields 340 from the set 330, including certain fields 340 in the set 330, and so on.

The preparer responds to the prompt 510 by providing a command or instruction 550 back to the electronic circuitry 500. The command 550 may or may not accept the prompt 510.

For example, if the preparer responds by answering "Yes" to the prompt 510 (e.g., by clicking on a "Yes" button), the electronic circuitry 500 adds the set 330 of fields 340 to other pages 310 of the document 300 in accordance with the command 550. Along these lines, electronic circuitry 500 adds the set 330 of fields 340 to one or more pages 310 as specified by the response information 540 from the preparer. In some arrangements, the electronic circuitry 550 adds the set 330 of fields 340 in the same location as that of the other pages. In other arrangements, the electronic circuitry 550 adds the set 330 of fields 340 in open or whitespace areas.

As further shown in FIG. 5, the electronic circuitry 500 modifies content of the specified pages 310 of the document 300 to include the set 330 of fields 340, outputs a prepared version 570 of the document 300 that includes the modified content of the different pages 310 of the document 300. In some embodiments, the electronic circuitry 500 stores fields as entries (e.g., as metadata in the same document or in a separate file) containing page identifiers (e.g., page number), page location (e.g., X-Y coordinates), field type, name, role, etc. and the electronic circuitry 500 adds new field entries to identify the new fields that are automatically configured and placed by the electronic circuitry 500. Accordingly, one or more other pages 310 of the document 300 now include the set 330 of fields 340.

However, if the preparer responds by answering "No" to the prompt 510, the electronic circuitry 500 does not add the set 330 of fields 340 to other pages 310 of the document 300. Rather, the electronic circuitry 500 returns to a state in which the electronic circuitry 500 responds to other document preparation input 110 from the preparer (also see FIG. 1). Along these lines, the preparer is able to continue operating the electronic circuitry 500 to add one or more fields 340 to one or more pages 310 of the document 300, to add more parties to the document 300, to make changes to the document 300, to notify parties that the document 300 is ready for signing, and so on.

FIG. 6 shows a page 310(n) of the prepared version 570 of the document 300 which includes a set 330 of signature fields 340 as added by the electronic circuitry 500. When the preparer initially inputted the document 300 to the electronic circuitry, the page 310(n) did not include the set 330 of signature fields 340. However, after the preparer enters or otherwise initiates the command 550 to the electronic circuitry 500 accepting the prompt 510, the electronic circuitry 500 added the set 330 of fields 340 to the page 310(n).

It should be understood that, based on the input 550 from the preparer (e.g., also see FIG. 5), the electronic circuitry 500 may have added the set 330 of fields 340 to other pages 310 as well. For example, the preparer may have identified all remaining pages 310 to receive the set 330 of fields 340, a range of pages 310 to receive the set 330 of fields 340, particular pages 310 to receive the set 330 of fields 340, and so on. Further details will now be provided with reference to FIG. 7.

Figure 7:
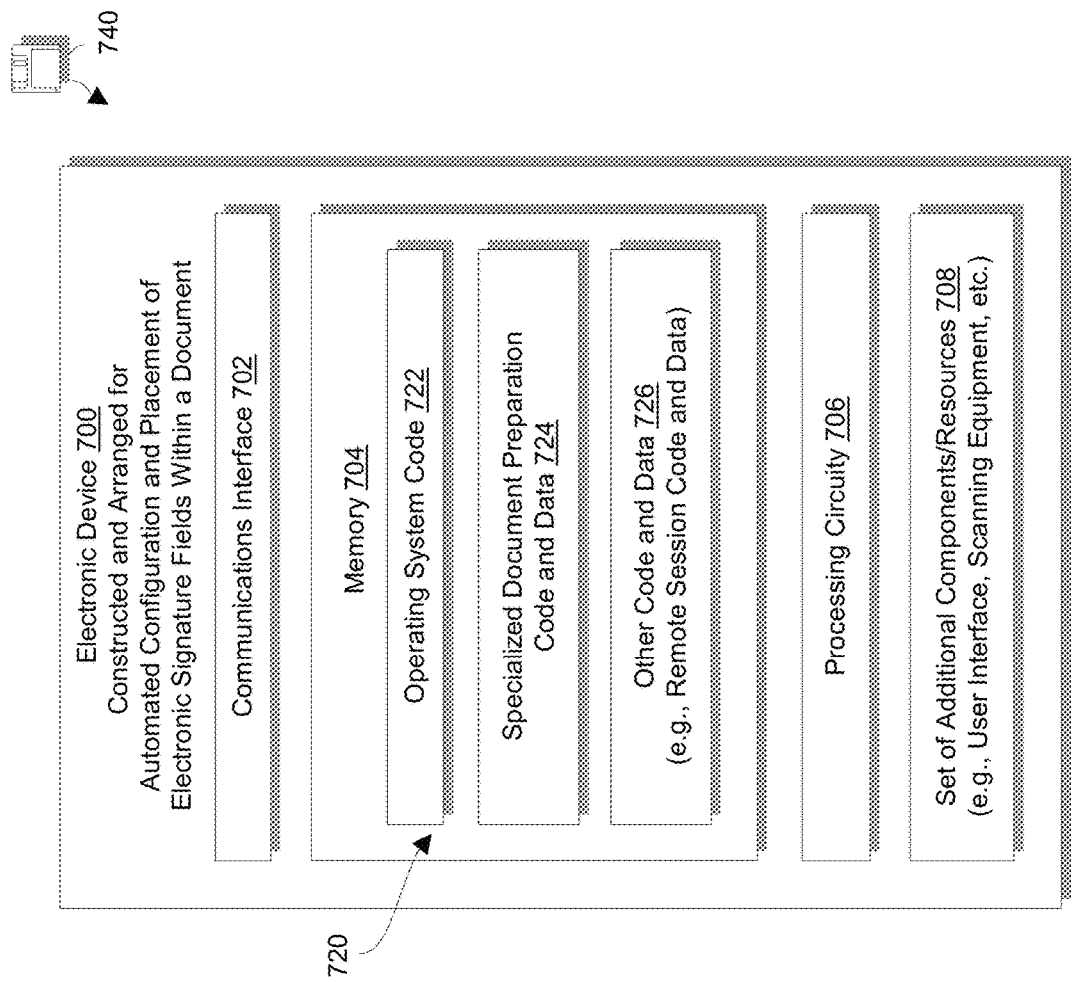
FIG. 7 is a view of an electronic device which is suitable for performing configuration and placement of electronic signature fields within a document in accordance with certain embodiments.

FIG. 7 is a view of an electronic device 700 which is suitable for automated configuration and placement of electronic signature fields 340 within a document 300. The electronic device 700 includes a communications interface 702, memory 704, processing circuitry 706, and a set of additional components/resources 708.

The communications interface 702 is constructed and arranged to connect the electronic device 700 to the communications medium 108 (also see FIG. 1). Accordingly, the communications interface 702 enables the electronic device 700 to communicate with the other components of the computing environment 100 such as user devices 102, a storefront server (e.g., see the other devices 106 in FIG. 1), and so on. Such communications may be line-based, wireless, combinations thereof, and so on. Moreover, such communications may utilize a variety of protocols (e.g., IP, cellular, fiber optic, RF, etc.).

The memory 704 is intended to represent both volatile storage (e.g., DRAM, SRAM, etc.) and non-volatile storage (e.g., flash memory, magnetic disk drives, etc.). The memory 704 stores a variety of software constructs 720 including an operating system 722, specialized document preparation code and data 724, and other code and data 726.

The processing circuitry 706 is constructed and arranged to operate in accordance with the various software constructs 720 stored in the memory 704. In particular, the processing circuitry 706, when executing the operating system 722, manages various resources of the electronic device 700 (e.g., memory allocation, processor cycles, security, etc.). Additionally, the processing circuitry 706, when operating in accordance with the specialized document preparation code and data 724, is constructed and arranged to perform automated configuration and placement of electronic signature fields within a document. Furthermore, the processing circuitry 706, when operating in accordance with the other code and data 724, is constructed and arranged to perform other operations such as provide access to a remote desktop environment.

It should be understood that the above-mentioned processing circuitry 706 may be implemented in a variety of ways including one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 740 is capable of delivering all or portions of the software to the electronic device 700. The computer program product 740 has a non-transitory and non-volatile computer readable medium that stores a set of instructions to control one or more operations of the electronic device 700.

Examples of suitable computer readable storage media include tangible articles of manufacture and apparatus that store instructions in a non-volatile manner such as CD-ROM, flash memory, disk memory, tape memory, and the like.

The additional components/resources 708 refers to various other componentry such as a user interface to receive user input and provide user output, scanning equipment to input an image of a physical document, and so on.

During operation, the electronic device 700 is able to perform the procedure 200 of FIG. 2. Along these lines, the electronic device 700 includes at least a portion of the electronic circuitry described above in connection with FIGS. 3 through 6. Further details will now be provided with reference to FIG. 8.

Figure 8:
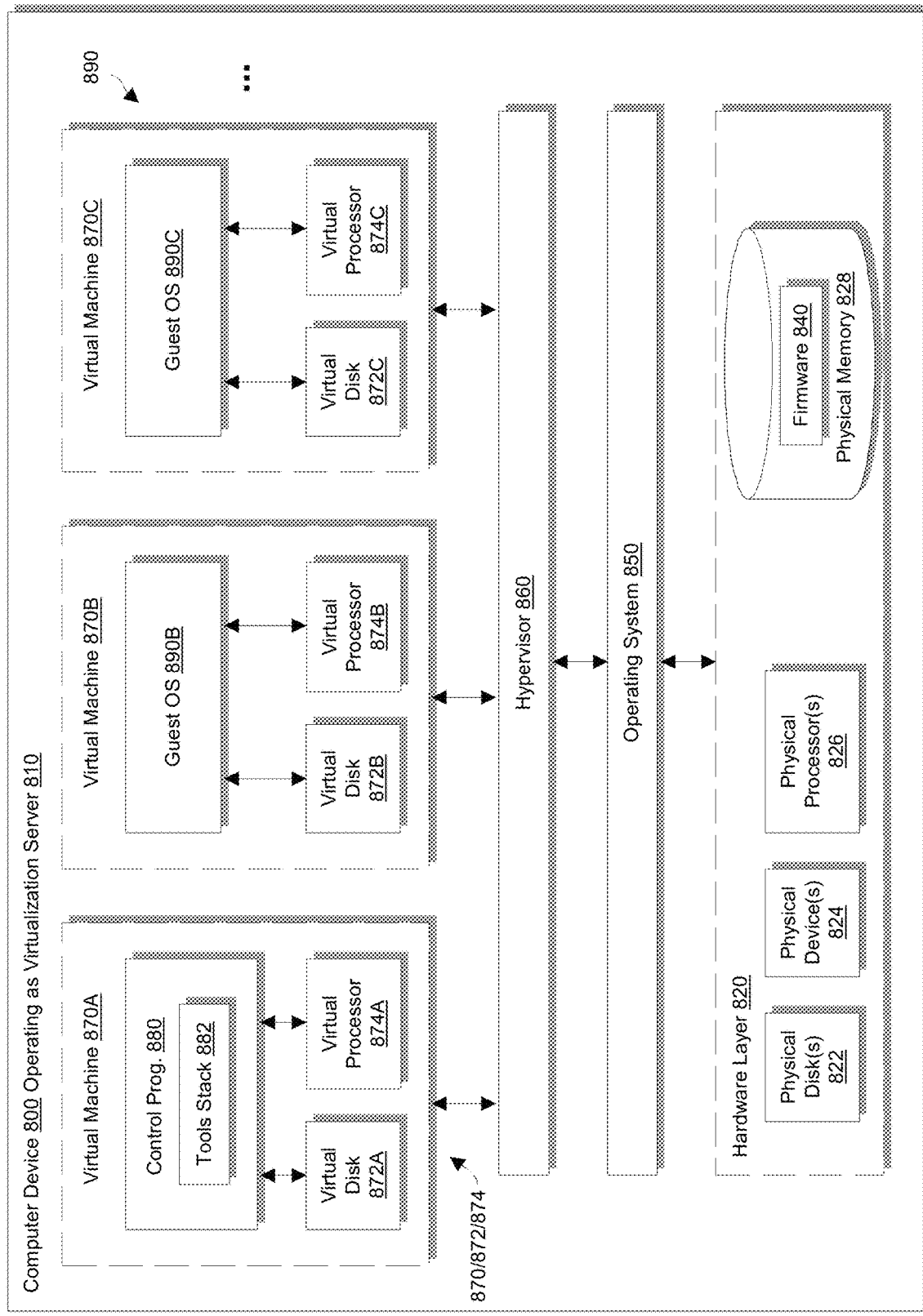
FIG. 8 is a block diagram of a virtualization server which is suitable for performing configuration and placement of electronic signature fields within a document in accordance with certain embodiments.

FIG. 8 shows a computer device 800 operating as a virtualization server 810 which is suitable for providing document preparation and signing services within the computing environment in accordance with certain embodiments. It should be understood that FIG. 8 shows a high-level architecture of an illustrative desktop virtualization system. Such a system is suitable for use as at least a portion of the electronic signature platform 104 (also see FIG. 1).

As shown in FIG. 8, the desktop virtualization system may be a single-server or multi-server system, or a cloud system, including at least one computer device 800 operating as a virtualization server 810 configured to provide virtual desktops and/or virtual applications to one or more client access devices (e.g., user devices 102). As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

The computer device 800 may be configured as a virtualization server in a virtualization environment, for example, a single-server, multi-server, or cloud computing environment. Virtualization server 810 illustrated in FIG. 8 may be deployed as and/or implemented by one or more embodiments of the earlier-mentioned electronic signature platform 104 or by other known computing devices. Included in virtualization server 810 is hardware layer 820 that may include one or more physical disks 822, one or more physical devices 824, one or more physical processors 826, and one or more physical memories 828. In some embodiments, firmware 840 may be stored within a memory element in physical memory 828 and be executed by one or more of physical processors 826. Virtualization server 810 may further include operating system 850 that may be stored in a memory element in physical memory 828 and executed by one or more of physical processors 826. Still further, hypervisor 860 may be stored in a memory element in physical memory 828 and be executed by one or more of physical processors 826. Presence of operating system 850 may be optional such as in a case where the hypervisor 860 is a Type A hypervisor.

Executing on one or more of physical processors 826 may be one or more virtual machines 870A, 870B, 870C, ... (generally, VMs 870). The VMs 870A, 870B, 870C, ... include respective virtual disks 872A, 872B, 872C, ... (generally, virtual disks 872) and respective virtual processors 874A, 874B, 874C, ... (generally, virtual processors 874). In some embodiments, the first VM 870A may execute, using virtual processor 874A, control program 880 that includes tools stack 882. Control program 880 may be referred to as a control virtual machine, Domain 0, Dom0, or other virtual machine used for system administration and/or control. In some embodiments, one or more VMs 870B, 870C, ... may execute, using their respective virtual processors 874B, 874C, ..., guest operating systems 890B, 890C, ... (generally, guest operating systems 890).

Physical devices 824 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 810. Physical memory 828 in hardware layer 820 may include any type of memory. Physical memory 828 may store data, and in some embodiments may store one or more programs, or set of executable instructions. FIG. 8 illustrates an embodiment where firmware 840 is stored within physical memory 828 of virtualization server 810. Programs or executable instructions stored in physical memory 828 may be executed by the one or more processors 826 of virtualization server 810.

Virtualization server 810 may also include hypervisor 860. In some embodiments, hypervisor 860 may be a program executed by processors 826 on virtualization server 810 to create and manage any number of virtual machines 870. Hypervisor 860 may be referred to as a virtual machine monitor, or platform virtualization software. In some embodiments, hypervisor 860 may be any combination of executable instructions and hardware that monitors virtual machines 870 executing on a computing machine. Hypervisor 860 may be a Type 2 hypervisor, where the hypervisor executes within operating system 850 executing on virtualization server 810. Virtual machines may then execute at a layer above hypervisor 860. In some embodiments, the Type 2 hypervisor may execute within the context of a user's operating system such that the Type 2 hypervisor interacts with the user's operating system. In other embodiments, one or more virtualization servers 810 in a virtualization environment may instead include a Type 1 hypervisor (not shown). A Type 1 hypervisor may execute on virtualization server 810 by directly accessing the hardware and resources within hardware layer 810. That is, while Type 2 hypervisor 860 accesses system resources through host operating system 850, as shown, a Type 1 hypervisor may directly access all system resources without host operating system 810. A Type 1 hypervisor may execute directly on one or more physical processors 826 of virtualization server 810, and may include program data stored in physical memory 828.

Hypervisor 850, in some embodiments, may provide virtual resources to guest operating systems 890 or control programs 880 executing on virtual machines 870 in any manner that simulates operating systems 890 or control programs 880 having direct access to system resources. System resources can include, but are not limited to, physical devices 822, physical disks 824, physical processors 826, physical memory 828, and any other component included in hardware layer 820 of virtualization server 810. Hypervisor 860 may be used to emulate virtual hardware, partition physical hardware, virtualize physical hardware, and/or execute virtual machines that provide access to computing environments. In still other embodiments, hypervisor 860 may control processor scheduling and memory partitioning for virtual machines 870 executing on virtualization server 810. Examples of hypervisor 860 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, virtualization server 810 may execute hypervisor 860 that creates a virtual machine platform on which guest operating systems 890 may execute. In these embodiments, virtualization server 810 may be referred to as a host server. An example of such a virtualization server is Citrix Hypervisor® provided by Citrix Systems, Inc., of Fort Lauderdale, Fla.

Hypervisor 860 may create one or more virtual machines 870 in which guest operating systems 890 execute. In some embodiments, hypervisor 860 may load a virtual machine image to create virtual machine 870. The virtual machine image may refer to a collection of data, states, instructions, etc. that make up an instance of a virtual machine. In other embodiments, hypervisor 860 may execute guest operating system 890 within virtual machine 870. In still other embodiments, virtual machine 870 may execute guest operating system 890.

In addition to creating virtual machines 870, hypervisor 860 may control the execution of at least one virtual machine 870. In other embodiments, hypervisor 860 may present at least one virtual machine 870 with an abstraction of at least one hardware resource provided by virtualization server 810 (e.g., any hardware resource available within hardware layer 810). In other embodiments, hypervisor 860 may control the manner in which virtual machines 870 access physical processors 826 available in virtualization server 810. Controlling access to physical processors 826 may include determining whether virtual machine 870 should have access to processor 826, and how physical processor capabilities are presented to virtual machine 870.

As shown in FIG. 8, virtualization server 810 may host or execute one or more virtual machines 870. Virtual machine 870 may be a set of executable instructions and/or user data that, when executed by processor 826, may imitate the operation of a physical computer such that virtual machine 870 can execute programs and processes much like a physical computing device. While FIG. 8 illustrates an embodiment where virtualization server 810 hosts three virtual machines 870, in other embodiments virtualization server 810 may host any number of virtual machines 870. Hypervisor 860, in some embodiments, may provide each virtual machine 870 with a unique virtual view of the physical hardware, including memory 828, processor 826, and other system resources 822, 824 available to that virtual machine 870. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 860 may create one or more unsecure virtual machines 870 and one or more secure virtual machines 870. Unsecure virtual machines 870 may be prevented from accessing resources, hardware, memory locations, and programs that secure virtual machines 870 may be permitted to access. In other embodiments, hypervisor 810 may provide each virtual machine 870 with a substantially similar virtual view of the physical hardware, memory, processor, and other system resources available to virtual machines 870.

Each virtual machine 870 may include a respective virtual disk 872 and respective virtual processor 874. Virtual disk 872, in some embodiments, may be a virtualized view of one or more physical disks 822 of virtualization server 810, or a portion of one or more physical disks 822 of virtualization server 810. The virtualized view of physical disks 822 may be generated, provided, and managed by hypervisor 860. In some embodiments, hypervisor 860 may provide each virtual machine 870 with a unique view of physical disks 822. Thus, in these embodiments, particular virtual disk 822 included in each virtual machine 870 may be unique when compared with other virtual disks 872.

Virtual processor 874 may be a virtualized view of one or more physical processors 826 of virtualization server 810. In some embodiments, the virtualized view of physical processors 826 may be generated, provided, and managed by hypervisor 860. In some embodiments, virtual processor 874 may have substantially all of the same characteristics of at least one physical processor 826. In other embodiments, virtual processor 874 may provide a modified view of physical processors 826 such that at least some of the characteristics of virtual processor 874 are different from the characteristics of the corresponding physical processor 826.

It should be understood that the computer device 800 operating as the virtualization server 810 may be configured to provide electronic signature services as a cloud service. Along these lines, various users involved in preparing and/or electronically signing a document are able to access the cloud service.

Figure 9:
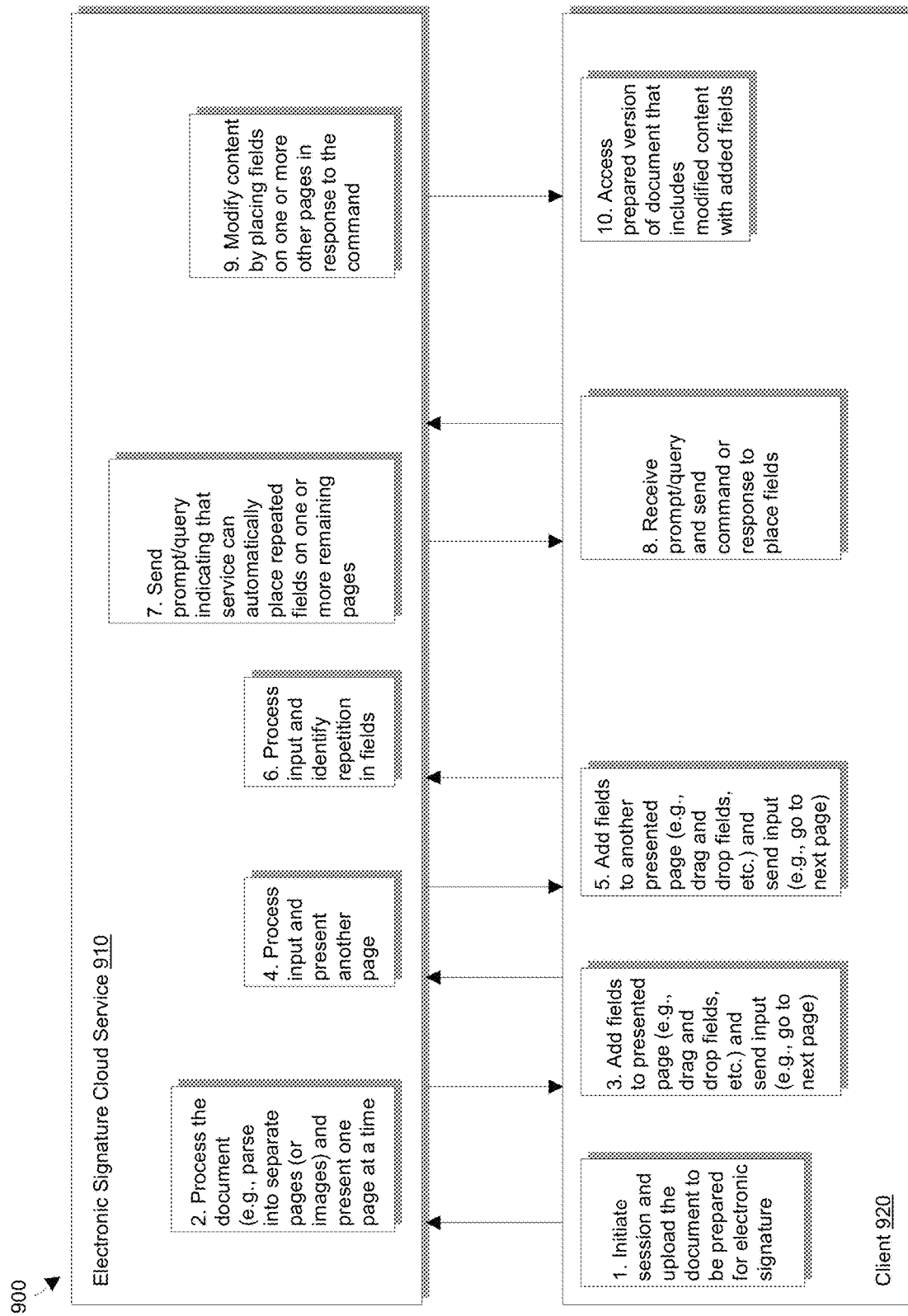
FIG. 9 is a sequence diagram illustrating certain activities and communications in accordance with certain embodiments.

FIG. 9 shows a sequence diagram 900 describing activities and communications between an electronic signature cloud service 910 and a client 920 operated by a user in accordance with certain embodiments. Such an electronic signature cloud service 910 may be provided by equipment which is accessible over a network (e.g., see the electronic signature platform 104 in FIG. 1). A suitable client 920 is equipment operated by a user, i.e., a human preparer (e.g., see the user device 102(1) in FIG. 1).

It should be understood that the client 920 may cache user input and convey the user input to the electronic signature cloud service 910 in a variety of ways. In some embodiments, the client 920 caches the user input as well as immediately conveys the user input to the electronic signature cloud service 910 thus enabling the electronic signature cloud service 910 to remain synchronized with the client 920 in real time. In other embodiments, the client 920 caches the user input, and waits for one or more events before conveying the cached user input to the electronic signature cloud service 910 (e.g., in response to the user navigating to a next page of the document) thus reducing consumption of network resources. Other scenarios are suitable for use as well such as the client 920 caching the user input, and periodically conveying the cached user input to the electronic signature cloud service 910 (e.g., every 5 seconds, every 10 seconds, etc.), combinations thereof, and so on.

At 1, while operating the client 920 and in accordance with a current example, the user, acting in his/her role as preparer of a document for signature, opens or otherwise initiates a session from the electronic signature cloud service 910 via a web URL. In some arrangements, the user may open the session via a remote desktop hosted by a remote desktop server (e.g., see the computer device 800 operating as a virtualization server 810 in FIG. 8). Additionally, the user uploads a document to be prepared for electronic signature (e.g., see the document 300 in FIGS. 3 through 6).

At 2, the electronic signature cloud service 910 completes opening the session and processes the document. The electronic signature cloud service 910 then presents the pages of the document to the user one page at a time. A variety of displaying mechanisms are suitable for use such as via a browser (e.g., in a web page), via a specialized GUI, and so on.

At 3, the user adds fields to the presented page and sends the input back to the electronic signature cloud service 910. For example, the user may drag and drop fields to particular locations on the presented page (e.g., see the signer entries 400 in FIG. 4). Such input may be communicated back to the electronic signature cloud service 910 periodically (e.g., every few seconds) or in response to an event (e.g., the user navigating to a next page).

At 4, the electronic signature cloud service 910 processes the input from the user and presents another page. Along these lines, the electronic signature cloud service 910 may store certain information such as the types of fields that the user added, particular locations of the fields, parties assigned to the fields, and so on.

At 5, in accordance with the current example, the user adds fields to another presented page and sends the input back to the electronic signature cloud service 910. Again, the user may drag and drop fields to particular locations on the other presented page.

At 6, in accordance with the current example, the electronic signature cloud service 910 processes the input from the user and identifies repetition in the fields that were added to the pages. Such repetition detection determines that there are pages with sets of signature fields common to one another (e.g., see FIGS. 3 and 4).

At 7, in response to such detection, the electronic signature cloud service 910 automatically sends a prompt indicating that the electronic signature cloud service 910 can place one or more repeated fields on one or more remaining pages. The prompt may take the form of a web page, graphic image within a specialized GUI, etc.

At 8, the client 920 receives the prompt and displays a view of the prompt to the user. The user then provides a command back to the electronic signature cloud service 910. In some arrangements, the user is able to identify particular pages, page ranges, field selections, etc. to the electronic signature cloud service 910 (e.g., see FIG. 5).

At 9, the electronic signature cloud service 910 modifies content of one or more other pages of the document in response to the command. Additionally, the electronic signature cloud service 910 outputs (or stores) a prepared version of the document that includes the modified content of the different pages of the document.

At 10, the client 920 may continue to access the prepared version of the document that includes the modified content. Accordingly, the task of adding the fields to the one or more other pages of the document is easy, efficient, and accurate.

Referring to FIG. 10, a cloud computing environment 1000 is depicted, which may also be referred to as a cloud environment, cloud computing or cloud network. The cloud computing environment 1000 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 1000, one or more clients (or user devices) 1002a-1002n (such as those described above) are in communication with a cloud network 1004. The cloud network 1004 may include back-end platforms, e.g., servers, storage, server farms or data centers. The users or clients 1002a-1002n can correspond to a single organization/tenant or multiple organizations/tenants. More particularly, in one example implementation the cloud computing environment 1000 may provide a private cloud serving a single organization (e.g., enterprise cloud). In another example, the cloud computing environment 1000 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 1000 may provide a hybrid cloud that is a combination of a public cloud and a private cloud. Public clouds may include public servers that are maintained by third parties to the clients 1002a-1002n or the enterprise/tenant. The servers may be located off-site in remote geographical locations or otherwise.

The cloud computing environment 1000 can provide resource pooling to serve multiple users via clients 1002a-1002n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 1000 can provide on-demand self-service to unilaterally provision computing capabilities (e.g., server time, network storage) across a network for multiple clients 1002a-1002n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 1000 can provide an elasticity to dynamically scale out or scale in response to different demands from one or more clients 1002. In some embodiments, the cloud computing environment 1000 can include or provide monitoring services to monitor, control and/or generate reports corresponding to the provided shared services and resources.

In some embodiments, the cloud computing environment 1000 may provide cloud-based delivery of different types of cloud computing services, such as Software as a service (SaaS) 1008, Platform as a Service (PaaS) 1012, Infrastructure as a Service (IaaS) 1016, and Desktop as a Service (DaaS) 1020, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Further Example Embodiments

The following examples pertain to further embodiments, from which numerous permutations and configurations will be apparent.

Example 1 includes a method of preparing a document for electronic signing. The method comprises identifying a set of signature fields common within the document, the set being for use with different pages of the document; in response to identifying the set of signature fields, modifying content of the different pages to include the set of signature fields; and outputting a prepared version of the document that includes the modified content of the different pages of the document.

Example 2 includes the subject matter of Example 1, wherein identifying the set of signature fields common within the document includes detecting placement of a common set of fields on at least two pages of the document.

Example 3 includes the subject matter of any of Examples 1 and 2, wherein detecting placement of the common set of fields includes detecting placement of a first set of fields on a first page of the document, detecting placement of a second set of fields on a second page of the document, the first page and the second page being consecutive pages of the document, and ascertaining that the first set of fields matches the second set of fields.

Example 4 includes the subject matter of any of Examples 1 through 3, wherein identifying the set of signature fields common within the document further includes ascertaining that the common set of fields has been placed on a first open area on a first page of the document and on a second open area on a second page of the document, the first open area on the first page and the second open area on the second page having page locations common to one another.

Example 5 includes the subject matter of any of Examples 1 through 4, wherein identifying the set of signature fields common within the document further includes, in response to detecting placement of the common set of fields on the at least two pages of the document, automatically prompting a user for an instruction to place the set of signature fields on pages of the document other than the at least two pages of the document, and receiving, from the user, the instruction to place the set of signature fields on the pages of the document other than the at least two pages of the document.

Example 6 includes the subject matter of any of Examples 1 through 5, wherein the set of signature fields includes fields configured to receive signature input from different signing parties.

Example 7 includes the subject matter of any of Examples 1 through 6, wherein the set of signature fields includes a single field configured to receive signature input from a particular signing party.

Example 8 includes the subject matter of any of Examples 1 through 7, wherein modifying the content of the different pages includes identifying respective placement locations on the different pages of the document.

Example 9 includes the subject matter of Example 8, wherein identifying the respective placement locations on the different pages of the document includes, for each page of a group of pages of the document, scanning that page for a peripheral open area on that page and selecting the peripheral open area on that page as a respective placement location on that page to receive the set of signature fields.

Example 10 includes the subject matter of any of Examples 1 through 9, further including detecting a page of the document that does not have a peripheral open area, and flagging the detected page to a user to enable the user to manually identify a placement location on the detected page for receiving the set of signature fields.

Example 11 includes the subject matter of Example 8, wherein identifying the respective placement locations on the different pages of the document includes, for each page of a group of pages of the document, scanning that page for an unused bottom area on that page and selecting the unused bottom area on that page on that page as a respective placement location on that page to receive the set of signature fields.

Example 12 includes the subject matter of Example 8, wherein identifying the respective placement locations on the different pages of the document includes ascertaining location coordinates for the common set of signature fields placed on the at least two pages of the document, and providing, as the respective placement locations on the different pages of the document, the location coordinates ascertained for the common set of signature fields.

Example 13 includes the subject matter of any of the Examples above, further including situating, on at least one of the pages of the document, a set of full signature fields that is different from the set of signature fields common within the document.

Example 14 includes the subject matter of Example 13, wherein the set of full signature fields is configured to receive a set of full signatures from a set of signing parties; and wherein the set of signature fields common within the document is configured to receive a set of initials from the set of signing parties.

Example 15 includes the subject matter of Example 13, wherein the set of full signature fields is configured to receive a set of full signatures from a set of signing parties; and wherein the set of signature fields common within the document is configured to receive a signed attestation from at least one of the signing parties.

Example 16 includes electronic circuitry, having memory; and control circuitry coupled with the memory. The memory stores instructions that, when carried out by the control circuitry, cause the control circuitry to perform a method as in any of Examples 1 through 15.

Example 17 includes a computer program product having a non-transitory computer readable medium which stores a set of instructions to prepare a document for electronic signing. The set of instructions, when carried out by computerized circuitry, causes the computerized circuitry to perform a method as in any of Examples 1 through 15.

As described above, improved techniques are directed to identifying sets of signature fields common within the document for use with different pages of a document. One or more other pages of the document may then be modified to include the set of signature fields. For example, such identification of the sets of signature fields common within the document may automatically prompt the user for input, and the user may respond with a command that directs subsequent placement and binding of the set of signature fields on the one or more other pages of the document for electronic signing. Accordingly, document preparation using the improved techniques is easy, efficient, and accurate.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computing environment 100 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, certain details were provided above in connection with preparing a document for electronic signature by multiple parties by way of example. In accordance with certain embodiments, the document may be prepared for electronic signing by a single party. In such a situation, the techniques enable document preparation to be easy, efficient, and more accurate.

Moreover, certain details were provided above in connection with each party having a single role by way of example.

In accordance with certain embodiments, one or more parties may have more than one role. For example, the person preparing the document may be a preparer, an acceding party, a broker, a party to a particular side of a transaction, combinations thereof, and so on.

It should be appreciated that certain conventional electronic signature products provide users/businesses the ability to upload documents, prepare the documents for e-signing, and send them to parties for signing. The parties then sign those electronic documents.

Some documents may require initials on each page and while other documents may not require initials on each page. For the documents requiring initials, there are no specific fields for initials and the user simply places initials at the bottom of the page. Since there are no specific fields, computer vision and optical character recognition techniques may not be helpful. This makes it challenging for contracts with multiple pages (e.g., 10 pages, 20 pages, 50 pages, etc.) where the sender/preparer of the document has to place the initials field on each page manually. For brokers/rental agencies which deal with 1000's of contracts on daily basis, this may be extremely time consuming and tedious.

In contrast to such manual endeavors, disclosed herein are techniques that auto configure and place initials for electronic signature document preparation. Along these lines, specialized circuitry may monitors repeated manual field placement and suggest autoplacement throughout the rest of (or portions of) the document. Accordingly, utilization of such techniques may greatly improve the user's experience.

In accordance with certain embodiments, specialized circuitry monitors page location (ex: bottom, left, etc.) where the sender/preparer places one or more fields for initials. When the specialized circuitry detects that the one or more fields has been placed on a certain number of pages (e.g., two pages, three pages, etc.), the specialized circuitry auto configures placement of the one or more initial fields on other pages (e.g., the remaining pages). Once the user confirms or accepts the prompt, the specialized circuitry places the one or more initials at the same location on other pages.

In some embodiments, the specialized circuitry identifies the location of the one or more initial fields that were added prior to making the prompt (e.g., towards the bottom left of the pages). In response to a user command accepting the prompt, the specialized circuitry places the one or more initial fields in a similar location (e.g., towards the bottom left of the pages).

In some embodiments, the specialized circuitry determines the appropriate roles that the user assigned or linked to the fields. Then, the specialized circuitry preserves the same appropriate roles for the fields when placing the fields on the new pages.

In some embodiments, the specialized circuitry attempts to smartly place the set of fields on the pages. Such smart placement may involve scanning the pages for open regions, white space, etc. that is large enough to receive the set of fields. Suitable techniques for performing such scanning include computer vision-image processing and OCR techniques, among others. Accordingly, the set of fields may be placed in different locations from page to page within the document.

In accordance with certain embodiments, certain processes involve:
1. Sender/Preparer navigating to a web URL for an electronic signature service 2. Sender/Preparer uploading the document (e.g., a pdf, an image, etc.)
3. Sender/Prepare specifying the roles of the signers instead of just simply adding signer1, signer2
  a. e.g., Buyer1, Buyer2, Seller1, Seller2, etc.
  b. e.g., Landowner1, Landowner2, Tenant1, Tenant2, Tenant3, etc. This particular input in the workflow helps electronic signature service understand how many signing parties exist and also their types
4. Sender, on a first page, specifies initials for a role(s)
5. The electronic signature service backend monitors that a user has specified initials field for a role and records the role and location where initials are placed.
6. Sender, on a second page, specifies initials for a role(s)
7. The electronic signature service backend monitors that a user has again specific such field and records the role and location where initials are placed.
8. The electronic signature service backend identifies that a user is trying to insert initials for a role(s) on each page and it prompts the user (e.g., with a popup) to auto insert initials for the role(s)
9. Sender provides confirmation and the initials are auto inserted.

It should be understood that certain use-case examples were described above as auto configuring and placing fields configured to receive a signer's initials by way of example only. Other types of fields may be auto configured and placed such as attestation clauses, notarization blocks, signature fields requiring long signatures, and so on.

Additionally, in some embodiments, the system looks at the content on different pages to find similar content associated with signature fields and then makes the prompt to the preparer. For example, the system may provide the prompt if the signature blocks all have the same the content adjacent to them, such as role, name title, or date. Alternatively or in combination, the system may look for that content on other pages, for instance, if the user includes someone's role (e.g., seller), the system may prompt the user about adding a field on that page.

Alternatively, suppose that the names of the parties are used at least once in the document and include references to their roles in a certain deal. In such a situation, the system may identify the parties based on the names and their associated role in the deal to further prompt the preparer for signature fields. Such arrangements, modifications and enhancements are intended to belong to various embodiments of the disclosure.

What is claimed is:

1. A method of preparing a document for electronic signing, the method comprising:
   identifying a set of signature fields common within the document, the set being for use with different pages of the document;
   in response to identifying the set of signature fields, modifying content of the different pages to include the set of signature fields; and
   outputting a prepared version of the document that includes the modified content of the different pages of the document;
   wherein identifying the set of signature fields common within the document includes:
   detecting placement of a common set of fields on at least two pages of the document;
   wherein detecting placement of the common set of fields includes:
   detecting placement of a first set of fields to receive signature input on a first page of the document,
   detecting placement of a second set of fields to receive signature input on a second page of the document, the first page and the second page being consecutive pages of the document, and
   ascertaining that the first set of fields matches the second set of fields; and
   wherein identifying the set of signature fields common within the document further includes:
   in response to detecting placement of the common set of fields on the at least two pages of the document, automatically prompting a user for an instruction to place the set of signature fields on pages of the document other than the at least two pages of the document, and
   receiving, from the user, the instruction to place the set of signature fields on the pages of the document other than the at least two pages of the document;
   wherein ascertaining that the first set of fields matches the second set of fields includes:
   ascertaining that the common set of fields has been placed on a first open area on the first page of the document and on a second open area on the second page of the document, the first open area on the first page and the second open area on the second page having page locations common to one another;
   wherein modifying the content of the different pages includes:
   identifying respective placement locations on the different pages of the document, and
   based on the instruction, situating the set of signature fields on the pages of the document other than the at least two pages of the document.

2. A method as in claim 1 wherein the set of signature fields includes fields configured to receive signature input from different signing parties.

3. A method as in claim 1 wherein the set of signature fields includes a single field configured to receive signature input from a particular signing party.

4. A method as in claim 1 wherein identifying the respective placement locations on the different pages of the document includes:
   for each page of a group of pages of the document, scanning that page for a peripheral open area on that page and selecting the peripheral open area on that page as a respective placement location on that page to receive the set of signature fields.

5. A method as in claim 4, further comprising:
   detecting a page of the document that does not have a peripheral open area, and
   flagging the detected page to a user to enable the user to manually identify a placement location on the detected page for receiving the set of signature fields.

6. A method as in claim 1 wherein identifying the respective placement locations on the different pages of the document includes:
   for each page of a group of pages of the document, scanning that page for an unused bottom area on that page and selecting the unused bottom area on that page on that page as a respective placement location on that page to receive the set of signature fields.

7. A method as in claim 1 wherein identifying the respective placement locations on the different pages of the document includes:
   ascertaining location coordinates for the common set of signature fields placed on the at least two pages of the document, and providing, as the respective placement locations on the different pages of the document, the location coordinates ascertained for the common set of signature fields.

8. A method as in claim 1, further comprising:
situating, on at least one of the pages of the document, a set of full signature fields that is different from the set of signature fields common within the document.

9. A method as in claim 8 wherein the set of full signature fields is configured to receive a set of full signatures from a set of signing parties; and
wherein the set of signature fields common within the document is configured to receive a set of initials from the set of signing parties.

10. A method as in claim 8 wherein the set of full signature fields is configured to receive a set of full signatures from a set of signing parties; and
wherein the set of signature fields common within the document is configured to receive a signed attestation from at least one of the signing parties.

11. Electronic circuitry, comprising:
memory; and
control circuitry coupled with the memory; the memory storing instructions that, when carried out by the control circuitry, cause the control circuitry to perform a method that includes:
identifying a set of signature fields common within the document, the set being for use with different pages of a document;
in response to identifying the set of signature fields, modifying content of the different pages to include the set of signature fields; and
outputting a prepared version of the document that includes the modified content of the different pages of the document;
wherein identifying the set of signature fields common within the document includes:
detecting placement of a common set of fields on at least two pages of the document;
wherein detecting placement of the common set of fields includes:
detecting placement of a first set of fields to receive signature input on a first page of the document,
detecting placement of a second set of fields to receive signature input on a second page of the document, the first page and the second page being consecutive pages of the document, and
ascertaining that the first set of fields matches the second set of fields; and
wherein identifying the set of signature fields common within the document further includes:
in response to detecting placement of the common set of fields on the at least two pages of the document, automatically prompting a user for an instruction to place the set of signature fields on pages of the document other than the at least two pages of the document, and
receiving, from the user, the instruction to place the set of signature fields on the pages of the document other than the at least two pages of the document;
wherein ascertaining that the first set of fields matches the second set of fields includes:
ascertaining that the common set of fields has been placed on a first open area on the first page of the document and on a second open area on the second page of the document, the first open area on the first page and the second open area on the second pane having page locations common to one another;
wherein modifying the content of the different pages includes:
identifying respective placement locations on the different pages of the document, and
based on the instruction, situating the set of signature fields on the pages of the document other than the at least two pages of the document.

12. A computer program product having a non-transitory computer readable medium which stores a set of instructions to prepare a document for electronic signing; the set of instructions, when carried out by computerized circuitry, causing the computerized circuitry to perform a method of:
identifying a set of signature fields common within the document, the set being for use with different pages of a document;
in response to identifying the set of signature fields, modifying content of the different pages to include the set of signature fields; and
outputting a prepared version of the document that includes the modified content of the different pages of the document;
wherein identifying the set of signature fields common within the document includes:
detecting placement of a common set of fields on at least two pages of the document;
wherein detecting placement of the common set of fields includes:
detecting placement of a first set of fields to receive signature input on a first page of the document,
detecting placement of a second set of fields to receive signature input on a second page of the document, the first page and the second page being consecutive pages of the document, and
ascertaining that the first set of fields matches the second set of fields; and
wherein identifying the set of signature fields common within the document further includes:
in response to detecting placement of the common set of fields on the at least two pages of the document, automatically prompting a user for an instruction to place the set of signature fields on pages of the document other than the at least two pages of the document, and
receiving, from the user, the instruction to place the set of signature fields on the pages of the document other than the at least two pages of the document;
wherein ascertaining that the first set of fields matches the second set of fields includes:
ascertaining that the common set of fields has been placed on a first open area on the first pane of the document and on a second open area on the second page of the document, the first open area on the first page and the second open area on the second page having page locations common to one another;
wherein modifying the content of the different pages includes:
identifying respective placement locations on the different pages of the document, and
based on the instruction, situating the set of signature fields on the pages of the document other than the at least two pages of the document.

13. A computer program product as in claim 12 wherein the method further comprises:

situating, on at least one of the pages of the document, a set of full signature fields that is different from the set of signature fields common within the document.

14. A method as in claim 1 wherein detecting placement of the first set of fields to receive signature input on the first page of the document includes:

detecting activity of placing a first signature field to receive signature input on the first page; and wherein detecting placement of the second set of fields to receive signature input on the second page of the document includes:

detecting activity of placing a second signature field to receive signature input on the second page.

15. A method as in claim 14 wherein the first unsigned signature field and the second unsigned signature field require the same signature.

16. Electronic circuitry as in claim 11 wherein detecting placement of the first set of fields to receive signature input on the first page of the document includes:

detecting activity of placing a first signature field to receive signature input on the first page; and wherein detecting placement of the second set of fields to receive signature input on the second page of the document includes:

detecting activity of placing a second signature field to receive signature input on the second page.

17. A computer program product as in claim 12 wherein detecting placement of the first set of fields to receive signature input on the first page of the document includes:

detecting activity of placing a first signature field to receive signature input on the first page; and wherein detecting placement of the second set of fields to receive signature input on the second page of the document includes:

detecting activity of placing a second signature field to receive signature input on the second page.

18. Electronic circuitry as in claim 11 wherein the method further includes:

situating, on at least one of the pages of the document, a set of full signature fields that is different from the set of signature fields common within the document.

19. Electronic circuitry as in claim 18 wherein the set of full signature fields is configured to receive a set of full signatures from a set of signing parties; and wherein the set of signature fields common within the document is configured to receive a set of initials from the set of signing parties.

20. Electronic circuitry as in claim 18 wherein the set of full signature fields is configured to receive a set of full signatures from a set of signing parties; and wherein the set of signature fields common within the document is configured to receive a signed attestation from at least one of the signing parties.

* * * * *